H. E. COOLEY.
NAILING AND TACKING MACHINE.
APPLICATION FILED JUNE 22, 1918.
1,398,258.
Patented Nov. 29, 1921.
3 SHEETS—SHEET 1.
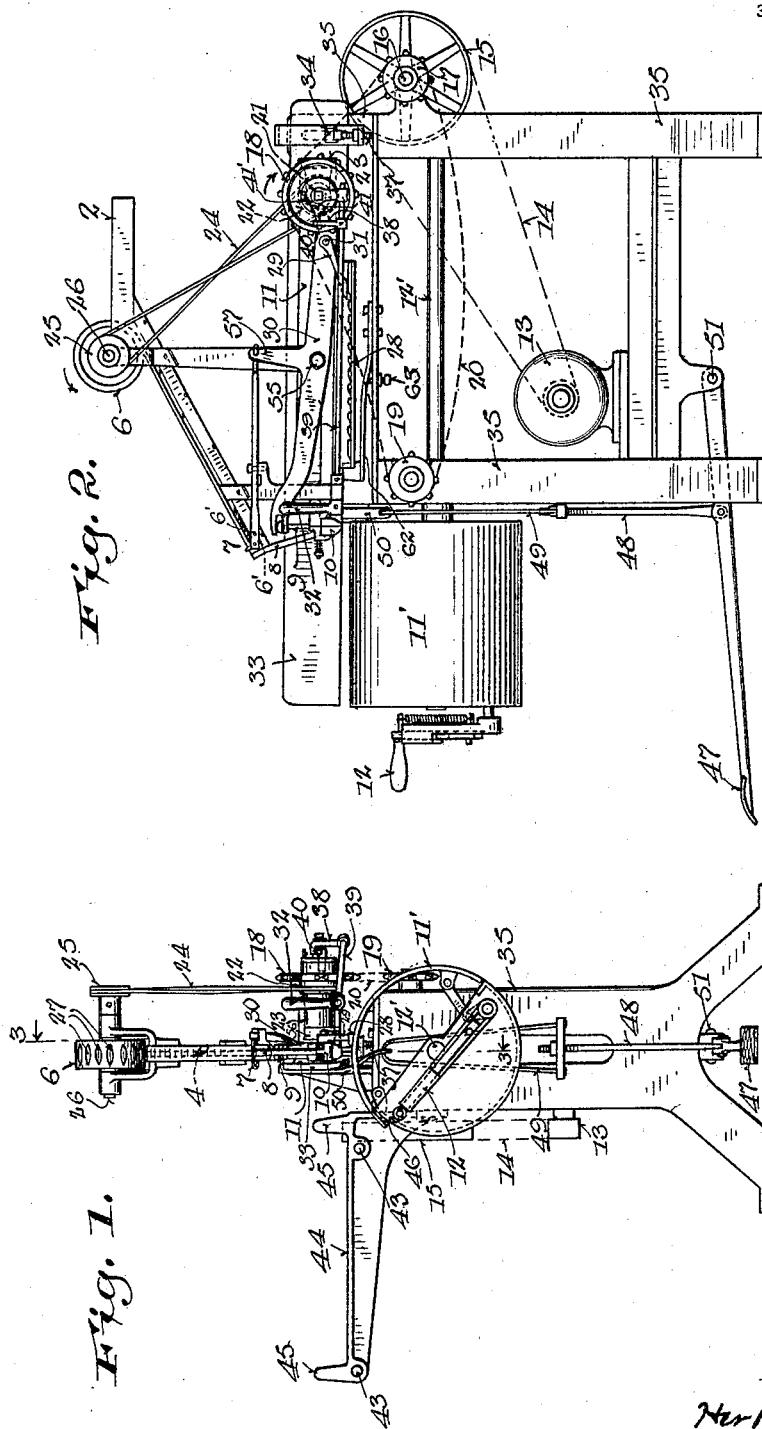

H. E. COOLEY.
NAILING AND TACKING MACHINE.
APPLICATION FILED JUNE 22, 1918.
1,398,258.
Patented Nov. 29, 1921.
3 SHEETS—SHEET 2.
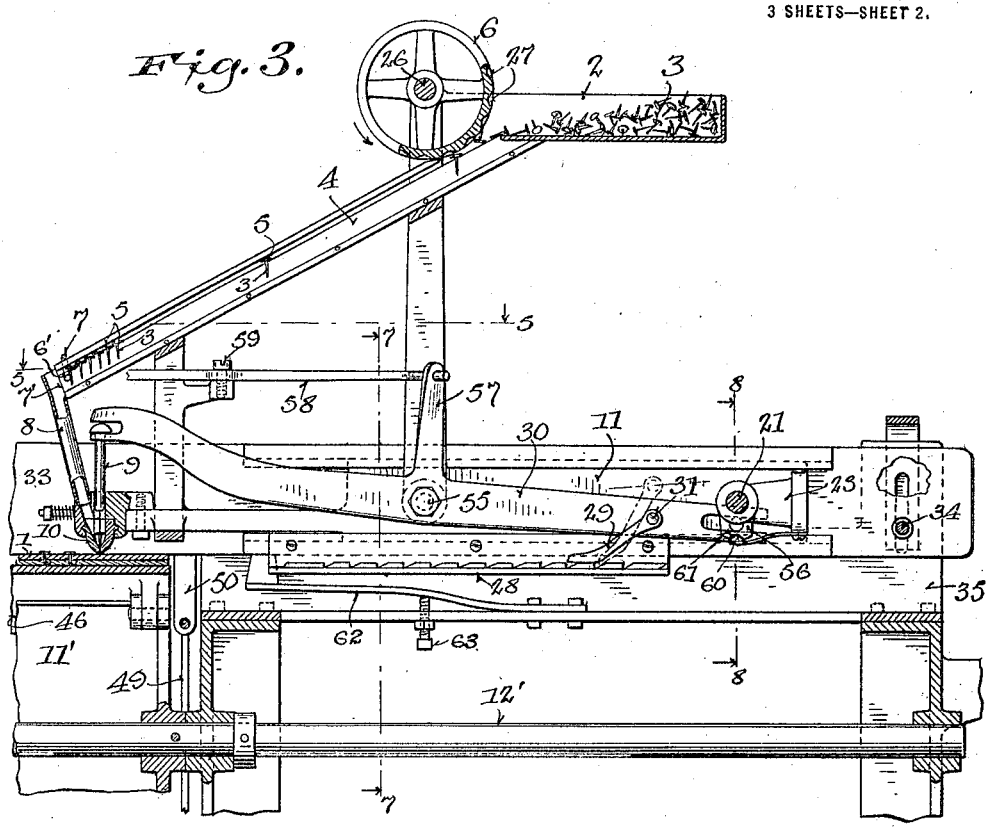
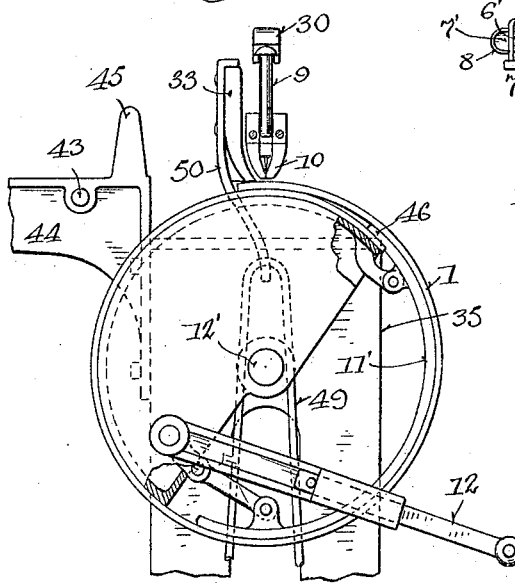
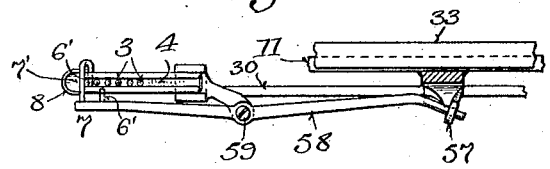
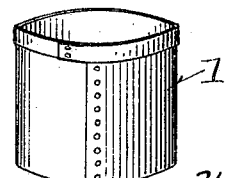
Inventor
Herbert E. Cooley
By Erwin & Wheeler
Attorneys

H. E. COOLEY.
NAILING AND TACKING MACHINE.
APPLICATION FILED JUNE 22, 1918.

1,398,258.

Patented Nov. 29, 1921.
3 SHEETS—SHEET 3.

Inventor
Hubert E. Cooley
By Erwin & Wheeler
Attorneys.

UNITED STATES PATENT OFFICE.

HERBERT E. COOLEY, OF WEST BEND, WISCONSIN.

NAILING AND TACKING MACHINE.

1,398,258.     Specification of Letters Patent.     Patented Nov. 29, 1921.

Application filed June 22, 1918. Serial No. 241,327.

*To all whom it may concern:*

Be it known that I, HERBERT E. COOLEY, a citizen of the United States, residing at West Bend, county of Washington, and State of Wisconsin, have invented new and useful Improvements in Nailing and Tacking Machines, of which the following is a specification.

My invention relates to machines for automatically tacking or nailing the laps of bent packages, such for example as cheese boxes, half-bushel measures, and in fact all kinds of receptacles formed of veneer.

My invention is further explained by reference to the accompanying drawings, in which—

Figure 7:
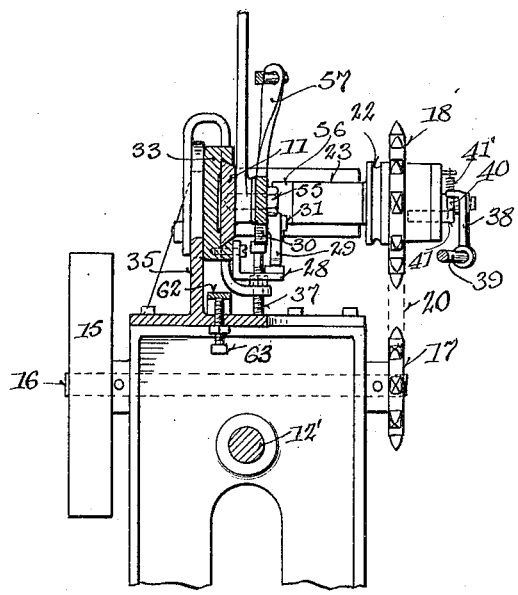
Figure 8:
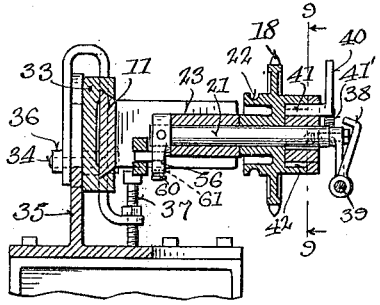
Figure 9:
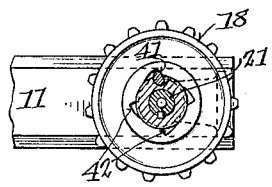
Figure 10:
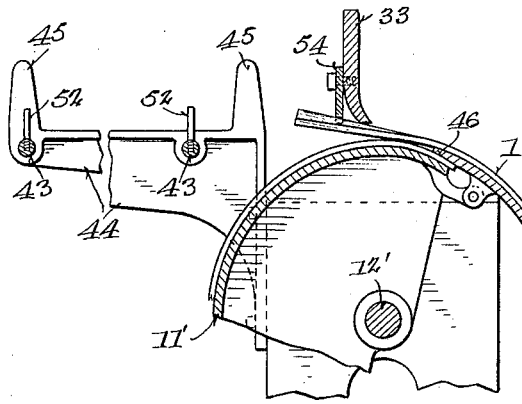
Figure 11:
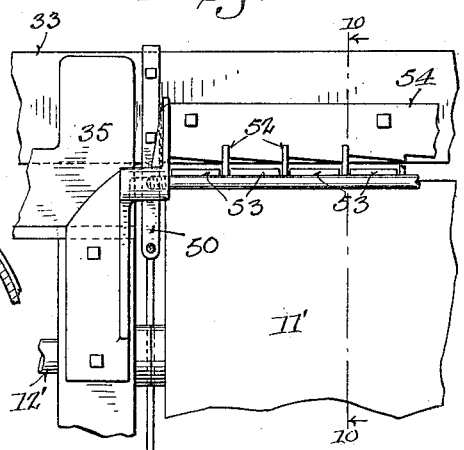

Figure 1 is an end view.
Fig. 2 is a side elevation.
Fig. 3 is a section on line 3—3 of Fig. 1.
Fig. 4 is a fragmental end view of the machine adjacent to the drum, parts being broken away.
Fig. 5 is a section on line 5—5 of Fig. 3.
Fig. 6 is a perspective view of the receptacle removed from the machine.
Fig. 7 is a section on line 7—7 of Fig. 3.
Fig. 8 is a section on line 8—8 of Fig. 3.
Fig. 9 is a section on line 9—9 of Fig. 8.
Fig. 10 is a modified form, on line 10—10 of Fig. 11, and
Fig. 11 is also a modified form of the veneer feeding bracket.

Like parts are referred to by the same reference numerals throughout the several views.

1 is the receptacle which is made with my machine. 2 is a hopper or box in which nails or tacks 3 are located preparatory to being driven. The nails or tacks 3 fall into the open slot 4, when they are suspended by their heads 5, while they slide under the wheel 6 until they reach the automatic controlled feed 7. The feed 7 consists of two pointed rods 6', 6', which move across the path of the nails or tacks, and just under the heads of the latter, thus holding said nails or tacks, and allowing the same to slide down about one-half of an inch at a time, passing into an opening 7' in the side of the pipe 8, the nails or tacks being guided one at a time under the punch 9 into the split jaw holder or guide 10.

All of the device thus far described is supported on the sliding bar 11, which bar is automatically moved about one inch at a time, thus driving the tacks or nails into the sheets of veneer about one inch apart, along the lap or bend of such material. The package thus formed is bent around an expanding drum 11' by hand with a telescoping crank handle 12. The telescoping crank handle is adapted to be extended or contracted so as to change the leverage, as may be required. The same lever is also used to expand said drum, said drum being mounted upon the shaft 12'. 13 is an electric motor which may be used for driving my machine, and when used it is connected with such machine through the belt 14 and pulley 15. The pulley 15 is mounted upon the shaft 16. 17 is a sprocket wheel which is also mounted upon said shaft 16. Motion is communicated from the sprocket wheel 17 to the two sprocket wheels 18 and 19 through the sprocket chain 20. The sprocket wheel 18 is loosely mounted on the shaft 21, said shaft being revolubly supported by the bracket 23 of the member 11. The chain 20 passes loosely over all of said sprocket wheels. Motion is communicated from the sprocket wheel 18 to the nail or tack agitator wheel 6, through the pulley 22, formed on the sprocket 18, belt 24, pulley 25 and shaft 26, whereby such nails or tacks are caused to enter said slot 4, as shown in Fig. 3. The wheel 6 is provided with an annular series of grooves or depressions 27, which contact with such nails or tacks, and causes them to be agitated until they enter said slot 4. 28 is a notched bar, and said bar is fixed and causes the pawl 29, and the parts connected therewith, to move rearwardly one or more notches at a time by the action of the lever 30, to which said pawl is pivoted on bolt 31.

Thus it is obvious that when the bar 11 has reached the position shown in Fig. 2 all of the nails or tacks will have been driven. 32 is a handle by which the bar 11 and the tacking mechanism is pushed forward manually on the clamping bar 33 preparatory to tacking or nailing the package. The clamping bar 33 is pivoted on the bolt 34, and said bolt is adjustably mounted on the frame 35. When a larger drum 11' is used the clamping bar 33 is raised by first loosening the nut 36, when the screw 37 is turned down slightly, when the nut 36 is again tightened. The handle 32 is also used to control the movement of the bar 11. 38 is a hook connected with the handle 32 by the rod 39, said hook 38 being adapted to engage the arm 40 of the clutch pin 41, and throw such clutch pin 41 out of engagement with any one of the notches 42 formed in the hub of the sprocket 18, against the tension of the spring 41'. Sheets of veneer are fed to the machine on the arms 43, 43, which arms are supported by the bracket 44. The bracket 44 is also provided with lugs 45 for lining up the veneer sheets as they are being fed into the forming device or drum 11'. The expansion of the drum 11' causes the jaw 46 to grip one end of the veneer which is then rolled around the forming drum 11'.

The lever 30 is pivotally mounted on the sliding bar 11 by the bolt 55, and said lever is oscillated thereon by the crank 56, fixed on the shaft 21. The forward end of the lever 30 engages the hammer bolt 9, as shown in Fig. 3, whereby such hammer bolt is actuated in driving a tack or nail.

The lever 30 is provided with an upwardly extending arm 57, which engages the lever 58, and causes the same to oscillate on the pivotal belt 59 for actuating the tack or nail feed mechanism 7.

The crank 56 is locked in its downward position when the machine is at rest by the spring pressed projection 60, engaging in the notch 61 in said crank 56.

The free end of the veneer is lapped over the gripped end, and held against such gripped end by the bar 33, preparatory to being nailed as shown in Fig. 4. The bar 33 is operated by the foot pedal 47, by a downward pressure of a person's foot thereon, said pedal being connected with said bar 33 by the rod 48, connecting loop 49 and strap 50. Said pedal is pivotally connected with the frame 35 of the machine by pivotal bolt 51. By the modified form shown in Figs. 10 and 11, the arms 43 are provided with pins 52, which are used to guide several strips of veneer, which strips are fed into the machine at one time, said pins being used to space and line up such strips.

The clamping bar 33 is provided with a notched bar 54 for the same purpose as said pins 52. The bar 33 is raised from clamping position by the spring 62, the tension of which can be adjusted by the screw 63.

The intermittent rearward movement and vibration of the hopper 2 feeds the tacks to the slot 4.

In a divisional application filed by me on September 12, 1921, Serial No. 499,950, I have claimed the tack separating and serving mechanism herein disclosed.

Having thus described my invention what I claim as new and desire to secure by Letters Patent, is:

1. A box nailing machine comprising a frame, a drum rotatably mounted at one end, a clamping bar pivoted to the frame and extending lengthwise above the drum, foot-controlled means for depressing the bar down onto the drum to clamp a box forming sheet thereto and means carried by the clamping bar for nailing a sheet wound upon the drum.

2. A box nailing machine comprising a frame, a drum rotatable on the front of the frame to be fully exposed to view, a clamping bar pivoted to the frame and overlying the drum to be depressed thereonto for clamping a box-forming sheet thereto, laterally disposed sheet-supporting means from which the box-forming sheets are fed to the drum beneath the overhanging clamping bar, nailing means slidably supported by the latter for movement longitudinally of the drum, and means for imparting intermittent movement to the nailing means rearwardly of the drum whereby the box thereon is left exposed to view.

3. A box forming and nailing machine comprising a frame, an expansible drum rotatably supported at one end thereof to be exposed to view, and including a combined unitary expanding and clamping member adapted to clamp a box-forming sheet to the drum and simultaneously expand the same, means for moving said member to operative position and also for rotating the drum to wind the sheet thereon, and means for nailing the sheet wound thereon.

4. A box nailing machine comprising a box-supporting drum, a pivotally mounted clamping bar extending thereover to clamp a box forming sheet thereto, a nailing mechanism slidably carried by the bar, means for moving the nailing mechanism step by step over the drum, and means for depressing the clamping bar and simultaneously lowering the nailing mechanism therewith to the work.

5. A box nailing machine comprising a box-supporting drum, a pivotally mounted clamping bar extending thereover to clamp a box forming sheet thereto, a support slidably carried by the clamping bar, nail-feeding means arranged on the support above the drum, nail-driving means including a driver-lever pivoted between its ends to the slidable support, means for oscillating the lever, a fixed rack bar, and means operable by the lever and engaging the rack bar for moving the slidable support intermittently.

6. A box nailing machine comprising a box-supporting drum, a pivotally mounted clamping bar extending thereover to clamp a box forming sheet thereto, a support slidably carried by the clamping bar, nail-feeding means arranged on the support above the drum, nail-driving means including a driver-lever pivoted between its ends to the slidable support, means for oscillating the lever and fixed rack bar, means operable by the lever and engaging the rack-bar for moving the slidable support intermittently, and means operable by the lever for controlling the nail-feeding means.

7. A box nailing machine comprising a box-supporting means, a slidable support movable therefrom, nail-driving means carried by the support for operating on a box on said first means, a lever pivoted between its ends to the support, and connected at one end to the driving means for operating the same on the downward movement thereof, a fixed notched bar, a pawl carried by the opposite end of the lever for progressively engaging the notched bar on downward movement of the last end of the lever for moving the slidable support step by step, and means for oscillating the lever.

8. A box nailing machine comprising a box support adapted to have a sheet of material wound thereon to form a box, a clamping member having a bottom edge depressible thereonto to hold a wound strip, means carried by said member and positioned adjacent and movable lengthwise of the bottom edge thereof for holding the nails to be driven into the box, and means movably supported by the clamping member for driving the nails positioned by said second means.

In testimony whereof I affix my signature in the presence of two witnesses.

HERBERT E. COOLEY.

Witnesses:
C. C. ALVAREZ,
E. J. ALTENDORF.